July 7, 1936.  F. A. PEARSON  2,046,480

HUMIDOSTAT

Filed Jan. 8, 1932

INVENTOR:
FREDERICK A. PEARSON,
BY:
Pennie, Davis, Marvin & Edmonds,
HIS ATTORNEYS.

Patented July 7, 1936

2,046,480

UNITED STATES PATENT OFFICE 2,046,480

HUMIDOSTAT

Frederick A. Pearson, Great Barrington, Mass.

Application January 8, 1932, Serial No. 585,480

9 Claims. (Cl. 297—1)

This invention relates to instruments for measuring the relative humidity of the atmosphere, and its chief object is to provide an instrument of this kind which will respond to, and indicate, the relative humidity in an improved manner, yet will be simple and cheap to make, and accurate and durable in service.

A particular object of the invention is to provide a hygrometer in which equal changes in humidity can be indicated, throughout the scale range, by equal divisions on the scale, instead of by unequal divisions, as heretofore the practice.

A further particular object of the invention is to provide in a hygrometer of this improved nature, a humidity-responsive, actuating element which will contract or expand in direct, linear proportion to changes in humidity at all degrees of humidity.

Still another particular object of the invention is to provide a highly compact hygrometer in which the actuating element can move angularly about an axis coinciding with the axis of the moving index member, thus obviating the necessity for the usual indirect connecting-mechanism, such as cam-connections, etc., between said element and the pointer, whereby to directly and positively effectuate changes in the indication of relative humidity.

It is also an object of the invention to provide a simple and rapid but highly efficient method for making the improved humidity-responsive element in large quantities.

Figure 1:
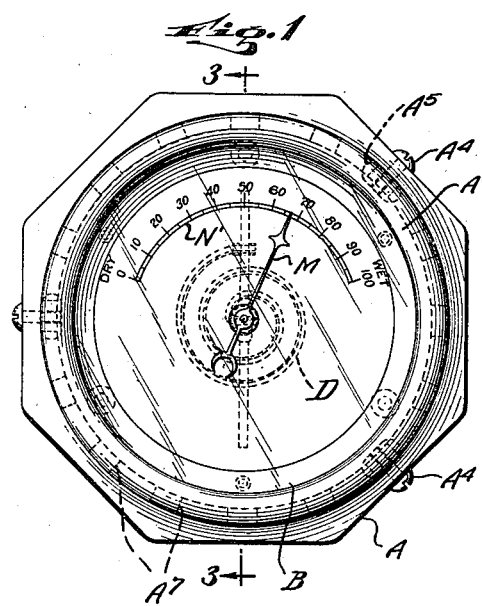
Figure 3:
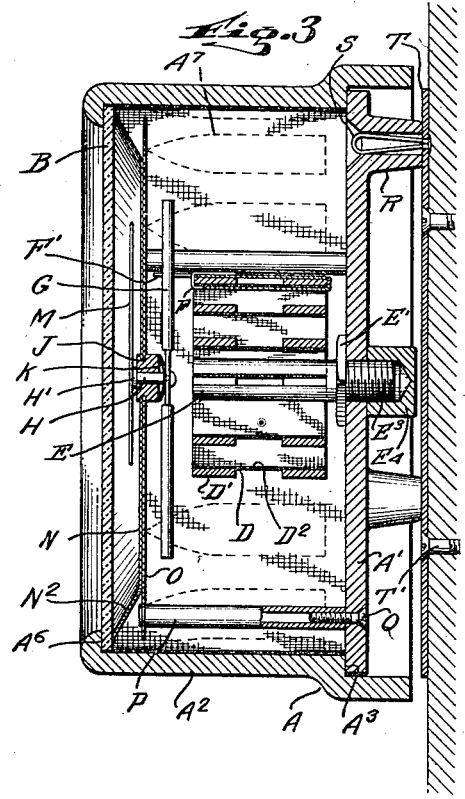
Figure 2:
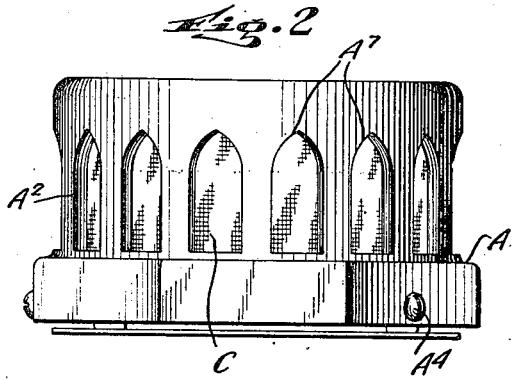
Figure 4:
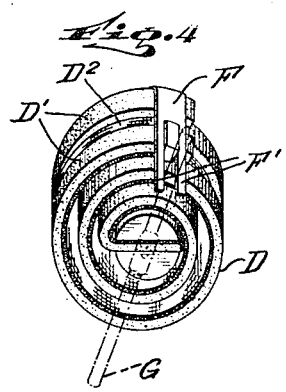
Figure 5:
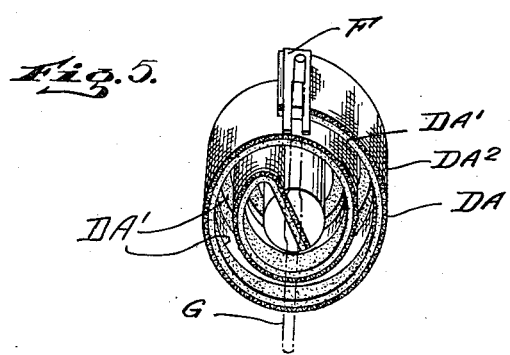

The presently preferred embodiment of the invention, together with several modifications thereof, are hereinafter described in conjunction with the accompanying drawing, but the inventive concept is limited only by the scope of the subjoined claims. In this drawing, Fig. 1 is a plan of the hygrometer, Fig. 2 is an elevation thereof, Fig. 3 is a section on line 3—3 of Fig. 1, Fig. 4 is a perspective view of the humidity-responsive element shown in Figs. 1 and 3, and Fig. 5 is a similar view of a modified element.

The construction shown in the drawing comprises a housing A, which consists of a circular base plate A' fitted within the belled lower end of a substantially cylindrical member A² and detachably mounted in one end thereof against an inner peripheral shoulder A³ formed on the member A². The plate A' is secured to the housing A by screws A⁴, which engage corresponding lugs A⁵ projecting from the plate A'. The base plate and cover are preferably made of a non-hygroscopic, insulating material of considerable structural strength, and which is capable of being molded or pressed into the desired shape, such as bakelite. The outside periphery of the lower end of the cover A² is preferably made of octagonal formation to enhance its appearance. The opposite end portion of the member A² is formed with an interior annular shoulder A⁶, against which a transparent cover-plate or crystal B is positioned. The member A² is formed with a series of spaced ports A⁷ in its wall, which occupy the major portion of the area of the member A² and permit free circulation of the air, the humidity of which is to be measured, into and through the chamber formed by the housing parts A¹, A² and B. A cylindrical wire screen C, of relatively fine mesh, is preferably arranged within the housing in contact with the inner wall-surface of the cover, and prevents the entrance of all but the finest particles of dust and other foreign material.

Within the housing is enclosed the improved humidity-responsive mechanism. Expansible hygroscopic substances, especially cellular, fibrous, or capillary substances, expand and contract quite unevenly with changes in relative humidity within the usual range of relative humidity values, i. e. the changes in dimensions of a member formed of hygroscopic material are never in direct linear proportion to the changes in the relative humidity. For example, a thin strip of hygroscopic wood, cut across the grain, will expand and contract over the entire range of relative humidity values, but its total change in length between 0% and 50% relative humidity will roughly be only half of the total change between 50% and 100% relative humidity. For this reason it has heretofore been the usual practice in constructing hygrometers to use an exhibiting surface graduated in scale divisions of varying length for equal changes in relative humidity values, and particularly for hygrometers of the type in which the humidity responsive element is connected directly to a deflecting member of the instrument exhibiting mechanism. With my improved humidity measuring mechanism hereinafter described, the deflecting member can be directly connected to the humidity responsive element, and yet an exhibiting surface graduated in scale divisions of equal length for equal increments of relative humidity may be used in conjunction therewith, with obvious advantages.

To this end, the humidity responsive element is made of a thin, elongated strip of hygroscopic material, of predetermined expansion and contraction characteristics, combined with a strip of elastic, non-hygroscopic material, the two strips being mutually so formed and arranged that the tension-stress in the non-hygroscopic, elastic strip will change in direct proportion to the changes in the force tending to expand or contract, respectively, the hygroscopic material, due to changes in the relative humidity of the atmosphere. By this arrangement, a restrictive force will be applied to the hygroscopic element which, when one end of the element is fixed, will cause its free end to move only in direct linear proportion to the change in humidity.

According to the preferred embodiment shown in Figs. 1, 3 and 4, the humidity responsive element D is constructed of two strips D' of hygroscopic material secured to a strip D² of elastic, non-hygroscopic material, the element so formed being arranged in a spiral formation with the inner end of the spiral secured in a slot formed in a fixed supporting post E, which is mounted at the center of the base plate A'. The post is mounted firmly in position by a flange E' thereon, held in contact with the inner side of the base plate by a nut E² threaded on an externally projecting post portion E³. The free end of the element D carries a bifurcated member F, the imperforate end of which is wrapped around the free end of the element and rigidly secured thereto. A pair of tines F' on the opposite end of the fork F project forwardly and slideably engage a bar G, which is movable about an axis in direct alignment with the axis of the post E. The bar G is secured to the inner end of a small spindle H, rotatably mounted in a bushing J. A small leaf spring K is arranged on the spindle H and between the inner end of the bushing and the bar G to take up any axial play in the parts carried by the bushing. The outer end of the spindle is formed with an enlarged portion H', which contacts with the outer end of the bushing and on which is fixed a suitable deflecting member, such as a pointer M.

The pointer M is arranged to move over a suitable indicating surface, such as the dial N bearing a scale N' graduated in equal divisions to indicate relative humidity values. The dial N is carried by the bushing J and formed with an outwardly inclined peripheral flange N², by means of which the crystal B and pointer M are spaced. The bushing J and parts carried thereby are supported in their normal operating positions by a plate O, which, as shown, is set in the bushing J, and is supported by the base plate A' through angularly spaced tubular supporting columns P. The outer ends of the columns P are connected to the plate O, while their inner end portions are internally threaded and engaged by screws Q carried by the base plate A'. The dial scale N is symmetrically arranged relative to the axis of rotation of the pointer and divided into equal scale divisions representing equal increments of relative humidity ranging from 0% to 100%. All the scale divisions are of the same arcuate length, which facilitates accurate reading of the instrument.

In the humidity responsive element D illustrated in Figs. 1–4, the hygroscopic material consists of two thin strips of cellular, fibrous wood cut across the grain, each about 6" long, $\frac{7}{16}$" wide and $\frac{1}{32}$" thick. The strips are arranged in parallel along the flat face of the ribbon of elastic, non-hygroscopic material, which is preferably made as a co-extensive wire screen of relatively fine mesh, the strips D' being secured thereto throughout their length. The element so composed is arranged in the form of a spiral, preferably making approximately two and a quarter convolutions about its point of support. As shown in Fig. 4, the wood strips are arranged on the outer side of the wire strip, and the spiral convolutions consequently extend in a clockwise direction from the center, as seen in Fig. 1, so that on any increase in relative humidity, the pointer will move from left to right over the scale.

With this construction and arrangement of the operating parts, on an increase in the relative humidity of the atmosphere, the minute cells in the exposed surface portions of the hygroscopic material will absorb moisture, causing the strips D' to tend to expand. No actual bodily movement of the wood strips relative to the wire can occur, however, because they are rigidly and permanently connected thereto. The material forming the outermost surface zone of the strips D', however, will actually expand and cause the free end of the humidity responsive element to move angularly in a clockwise direction. The free end will also move radially outwardly, as seen by Figs. 1 and 4. This compound movement will increase the tension on the wire. The greater the expansion force on the wood, the greater will be the increase in tension on the wire strip. The movement of the free end in response to an increase in relative humidity will thus be continuously and increasingly opposed by the stress in the wire. The resultant angular displacement of the free end of the element, when constructed and arranged in the manner described, has been found to effect a deflection of the member M corresponding in amount exactly to the arcuate length of a scale division for such a change in relative humidity. On a decrease in relative humidity, the free end of the spiral will move in the opposite direction, due to the contraction of the hygroscopic material and tension of the elastic strip.

An element like that above described must be made, however, when the wood strips are dry, so that the device will indicate properly, but dry wood cannot be bent or otherwise shaped, without breaking. Also, since the interconvolution spaces of the desired spiral are too small, the element cannot be made by initially bending the wire in spiral form and then inserting the wood strips and applying them. Moreover, the strips cannot be attached together in the usual manner without wetting the wood and consequently causing its expansion before the parts are permanently connected.

To overcome these difficulties, the humidity responsive element above described is formed, according to the present invention, by attaching the ends of the wood strips, while at the length corresponding to room humidity, to the corresponding end portions of the strip of wire mesh, all of the strips being in flat, uncoiled condition. A thin sheet or film of adhesive material, non-soluble in water, and capable of remaining in a solid, pliable, resilient form until a suitable solvent is applied thereto, is then inserted between the wood and wire strips. I have discovered that a sheet of celluloid approximately .005" thick is suitable for use as the film, and that acetone is suitable for use as the solvent, and these are the materials I prefer. The combined ribbon of wire, undissolved strip of adhesive, and wood is then wound on a suitable core into a tight spiral. The winding is subsequently released to permit the element to assume a free spiral formation of the kind in which there is no tension on the wire. The combined materials are then thoroughly dried, during which process the wood strips will be held in a spiral shape by the wire without breaking. This drying operation contracts the wood sufficiently to put the wire strip under a slight compression. The strips are then rewound tightly on the core and dipped in a bath of the solvent which causes the adhesive material to become viscid and bind the wire and wood together. The strips are firmly fastened together by a further manual tightening of the spiral. The element is then dried while in this position, causing the reagent to evaporate entirely, leaving the element bone dry. The element on being released from this treatment maintains its spiral form, its size however depending upon the instantaneous value of the humidity of the atmosphere in contact therewith.

This method may be used to form a humidity responsive element with the wood strips on either the inside or the outside of the wire strip, although the desired relation between the tension of the wire mesh and the expansion and contraction forces of the wood has been found to be more accurately attained when the wood strips are on the inside. The use of a plurality of narrow strips of wood on a single ribbon of wire mesh advantageously improves the circulation of the atmosphere within the spiral and in contact with the portions of the wood strips forming the inner convolutions.

Another method of forming a humidity responsive element having the desired linear law of operation according to the present invention, consists in contracting the wood strips to their smallest length when flat and while in this condition attaching them to a flat wire strip. A thin film of adhesive material in its solid, untreated state is attached to one side of the spaced wood strips after the latter have been dried. The adhesive material is then slightly moistened with the acetone, and pressed upon the wood strips. The parts are then re-dried, during which operation the adhesive material shrinks considerably, thereby causing the already dried wood to be compressed and further decrease in length. The wood strips, with their coating of adhesive material, are then firmly pressed against the flat wire ribbon and the solvent, in vapor form, is brought into contact with the layer of adhesive material at the side thereof which is in contact with the wire. The wood is prevented from expansion beyond the desired predetermined limit, during this operation by the initial pressure exerted thereon by the shrunk adhesive, and the compression pressure in the wood results in the wire strip being intermeshed into the adhesive material when the latter becomes viscid. Indeed, the wire is thereby forced into direct contact with the wood strips themselves. The element so formed is then dried, and then wound on a suitable core into a spiral form, with the wood strips on the inner side of the spiral. This winding operation further contracts the innermost surface portions of the wood strips, and puts the wire strip under tension. The spiral is then released and enlarges to a position in which there will be little or no tension on the wire if the wood is exposed to air of low humidity so that the wood is at its maximum contraction. When an element so constructed is exposed to humid air, the material forming the inner surface portions of the wood strips expands and causes the free end of the element to move angularly against the tension of the wire strip, which tension increases in direct linear proportion to the expansion forces on the wood strips.

A humidity responsive element DA constructed according to the method just described is illustrated in Fig. 5. The wood strips DA' are located on the inner side of the wire strip DA², and the free end of the element has an angular movement in direct linear proportion to changes in the relative humidity of the atmosphere. The free end of this spiral will be moved in a direction which will cause the spiral to uncurl on increases in humidity, and the element is hence arranged in the hygrometer reversely to the arrangement of the element D shown in Fig. 4.

The humidity responsive elements of Figs. 4 and 5 have been found in practice to have a uniform angular movement of approximately 150° for the entire range of relative humidities at a room temperature of 70° F. It is unnecessary to compensate the instrument for the effect of thermal expansion of the parts, as the excess of expansion of the wire over the wood for a change of 10° F. is less than 1% of the total expansion of the wood for the whole hygrometric range.

The complete instrument can be mounted in various positions without affecting its operation. It is particularly designed, however, to be detachably mounted on a vertical wall surface, as illustrated in Fig. 2. For this purpose, the baseplate A' is formed with a plurality of integral tubular lugs R arranged in a triangular formation on its outer surface and projecting slightly beyond the corresponding end of the cover A². The lugs R are proportioned and arranged to receive correspondingly arranged U-shaped spring pins S mounted on a separate plate T, which is adapted to be permanently secured to a wall surface in a suitable manner, such as by the screws T'. With this arrangement, the instrument can be easily removed and replaced for cleaning or repair.

The invention has been described as embodied in an instrument serving solely to indicate the humidity, but it is to be understood that the mechanism disclosed can be readily incorporated in instruments which will record, as well as indicate, the humidity measurements; or utilize the movements made to control other apparatus, such as to make and break electrical circuits, open and close small air valves, etc.

I claim:

1. The steps in the method of making a humidity-responsive element from a hygroscopic, relatively non-elastic material and a non-hygroscopic, relatively elastic material, which consist in associating a resilient, adhesive material with and between the other two materials, treating the adhesive with a reagent which will render it viscid, and winding the three into a tight spiral.

2. The steps in the method of making a spiral humidity-responsive element from a hygroscopic, relatively non-elastic material and a non-hygroscopic, relatively elastic material, comprising applying to at least one of the strips a resilient adhesive, bringing together these strips with the remaining strip treating the aggregate to render the adhesive viscid, and winding the three associated strips into tightened, spiral form.

3. The method of making a humidity-responsive element from a strip of capillary wood cut across-grain and a strip of relatively elastic non-hygroscopic material, comprising applying to at least one of the strips a strip of solid, resilient adhesive, bringing together these strips with the remaining strip treating the aggregate to render the adhesive viscid, and winding the three about an axis parallel to their width.

4. The method of making a humidity-responsive element from a hygroscopic, relatively non-elastic material and a non-hygroscopic elastic material, comprising inserting a dry, resilient adhesive between the two, winding the three into a tight spiral, releasing the spiral, drying the spiral, re-winding the spiral tightly, treating the spiral with a solvent capable of making the adhesive viscid, and drying the spiral again.

5. The method of making a humidity-responsive element from a hygroscopic, relatively non-elastic material and a non-hygroscopic, elastic material, comprising inserting a dry, resilient adhesive therebetween, winding the three into a tight spiral, releasing the spiral, drying the spiral, tightening the spiral, dipping the spiral while tightened into a solvent capable of making the adhesive viscid, drying the spiral while tightened, and releasing the spiral to assume a somewhat uncoiled arrangement.

6. The method of making a humidity-responsive element from a hygroscopic, relatively non-elastic material and a non-hygroscopic, elastic material, comprising drying the hygroscopic material, associating same with a resilient adhesive, dipping the two in a solvent of the adhesive, drying the united strips, associating the elastic material with the said united strips, treating the association with a non-wetting solvent of the adhesive material, drying the three united strips, winding same into a tight spiral, and releasing the spiral to assume a more or less uncoiled arrangement.

7. The method of making a humidity-responsive element from an hygroscopic, relatively non-elastic material, and a non-hygroscopic, elastic material, which comprises removing substantially all moisture from the hygroscopic material, attaching the dried hygroscopic material to the non-hygroscopic, elastic material, and winding the secured hygroscopic and non-hygroscopic materials into a spiral.

8. The method of making a humidity-responsive element from an hygroscopic, relatively non-elastic material, and a non-hygroscopic, elastic material, which comprises drying the hygroscopic material, adhesively securing the dried hygroscopic material to the non-hygroscopic, elastic material, redrying the hygroscopic material and winding the secured hygroscopic and non-hygroscopic materials into a spiral.

9. The method of making a humidity-responsive element from an hygroscopic, relatively non-elastic material, and a non-hygroscopic, elastic material, comprising drying the hygroscopic material, attaching the dried hygroscopic material to a resilient adhesive, redrying the hygroscopic material, attaching the elastic material to the adhesive previously applied to the hygroscopic material, and winding the composite strip into a spiral.

FREDERICK A. PEARSON.